US006598122B2

(12) United States Patent
Mukherjee et al.

(10) Patent No.: US 6,598,122 B2
(45) Date of Patent: Jul. 22, 2003

(54) ACTIVE LOAD ADDRESS BUFFER (75) Inventors: Shubhendu S. Mukherjee, Framingham, MA (US); Steven K. Reinhardt, Ann Arbor, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 265 days.

(21) Appl. No.: 09/839,621

(22) Filed: Apr. 19, 2001

(65) Prior Publication Data

US 2001/0034827 A1 Oct. 25, 2001

Related U.S. Application Data (60) Provisional application No. 60/198,530, filed on Apr. 19, 2000.

(51) Int. Cl.$^7$ .............................................. G06F 12/08
(52) U.S. Cl. ....................... 711/126; 711/144; 711/145; 712/216; 712/225
(58) Field of Search ................................ 711/125, 144, 711/145, 126, 162; 712/216, 225

(56) References Cited

U.S. PATENT DOCUMENTS

| 5,758,142 A | 5/1998 | McFarling et al. | 395/586 |
| 5,933,860 A | 8/1999 | Emer et al. | 711/213 |

OTHER PUBLICATIONS

M. Franklin, "Incorporating Fault Tolerance in Superscalar Processors," Proceedings of High Performance Computing, Dec., 1996.

A. Mahmood et al., "Concurrent Error Detection Using Watchdog Processors—A Survey," IEEE Trans,. on Computers, 37(2):160–174, Feb. 1988.

J. H. Patel et al., "Concurrent Error Detection In ALU's by Recomputing With Shifted Operands," IEEE Trans. on Computers, 31(7):589–595, Jul. 1982.

D. A. Reynolds et al., "Fault Detection Capabilities Of Alternating Logic," IEEE Trans. on Computers, 27(12):1093–1098, Dec. 1978.

E. Rotenberg et al., "Trace Cache: A Low Latency Approach To High Bandwidth Instruction Fetching," Proceedings of the 29th Annual International Symposium on Microarchitecture, pp. 24–34, Dec. 1996.

E. Rotenberg et al., "Trace Processors," 30th Annual International Symposium on Microarchitecture (MICRO–30), Dec. 1997.

T. J. Slegel et al., "IBM's S/390 G5 Microprocessor Design," IEEE Micro, pp. 12–23, Mar./Apr. 1999.

(List continued on next page.)

*Primary Examiner*—Hiep T. Nguyen (57) ABSTRACT

A redundantly threaded processor is disclosed having an Active Load Address Buffer ("ALAB") that ensures efficient replication of data values retrieved from the data cache. In one embodiment, the processor comprises a data cache, instruction execution circuitry, and an ALAB. The instruction execution circuitry executes instructions in two or more redundant threads. The threads include at least one load instruction that causes the instruction execution circuitry to retrieve data from the data cache. The ALAB includes entries that are associated with data values that a leading thread has retrieved. The entries include a counter field that is incremented when the instruction execution circuitry retrieves the associated data value for the leading thread, and that is decremented with the associated data value is retrieved for the trailing thread. The entries preferably also include an invalidation field which may be set to prevent further incrementing of the counter field.

20 Claims, 2 Drawing Sheets

OTHER PUBLICATIONS

J. E. Smith et al., "Implementing Precise Interrupts In Pipelined Processors," IEEE Trans. on Computers, 37(5):562–573, May 1988.

G. S. Sohi et al., "A Study Of Time–Redundant Fault Tolerance Techniques For High–Performance Pipelined Computers," Digest of Papers, 19th International Symposium on Fault–Tolerant Computing, pp. 436–443, 1989.

G. S. Sohi et al., "Instruction Issue Logic For High–Performance, Interruptible, Multiple Functional Unit, Pipelined Computers," IEEE Transactions on Computers, 39(3):349–359, Mar. 1990.

D. M. Tullsen, et al. "Simultaneous Multithreading: Maximizing On–Chip Parallelism," Proceedings of the 22nd Annual International Symposium on Computer Architecture, Italy, Jun. 1995.

D. Tullsen et al., "Exploiting Choice: Instruction Fetch And Issue On An Implementable Simultaneous Multithreading Processor," Proceedings of the 23rd Annual International Symposium on Computer Architecture (ISCA), May, 1996.

S. K. Reinhardt et al., "Transient Fault Detection Via Simultaneous Multithreading" (12 p.).

L. Spainhower et al., "IBM S/390 Parallel Enterprise Server G5 Fault Tolerance: A Historical Perspective," IBM J. Res. Develop. vol. 43, No. 5/6, Sep./Nov. 1999, pp. 863–873.

M. Franklin, "A Study Of Time Redundant Fault Tolerance Techniques For Superscalar Processors" (5 p.).

K. Sundaramoorthy et al., "Slipstream Processors: Improving Both Performance And Fault Tolerance" (6 p.).

AR–SMT: *Microarchitectural Approach To Fault Tolerance In Microprocessors,* Eric Rotenberg, (8 p.).

DIVA: *A Dynamic Approach To Microprocessor Verification,* Todd M. Austin, Journal of Instruction–Level Parallelism 2 (2000) 1–6, Submitted Feb. 2000; published May 2000 (26 p.).

DIVA: *A Reliable Substrate For Deep Submicron Microarchitecture Design,* Todd M. Austin, May/Jun. 1999 (12 p.).

ACTIVE LOAD ADDRESS BUFFER

CROSS-REFERENCE TO RELATED APPLICATIONS

This application is a non-provisional application claiming priority to provisional application Ser. No. 60/198,530, filed on Apr. 19, 2000, entitled "Transient Fault Detection Via Simultaneous Multithreading," the teachings of which are incorporated by reference herein.

This application is further related to the following applications, each of which is hereby incorporated herein by reference:

U.S. patent application Ser. No. 09/584,034 filed May 30, 2000, and entitled "Slack Fetch to Improve Performance of a Simultaneous and Redundantly Threaded Processor";

U.S. patent application Ser. No. 09/837,995 filed Apr. 19, 2001, and entitled "Simultaneously and Redundantly Threaded Processor Store Instruction Comparator";

U.S. patent application Ser. No. 09/839,459 filed Apr. 19, 2001, and entitled "Cycle Count Replication in a Simultaneous and Redundantly Threaded Processor";

U.S. patent application Ser. No. 09/838,078 filed Apr. 19, 2001, and entitled "Simultaneous and Redundantly Threaded Processor Branch Outcome Queue";

U.S. patent application Ser. No. 09/838,069 filed Apr. 19, 2001, and entitled "Input Replicator for Interrupts in a Simultaneous and Redundantly Threaded Processor";

U.S. patent application Ser. No. 09/839,626 filed Apr. 19, 2001, and entitled "Simultaneously and Redundantly Threaded Processor Uncached Load Address Comparator and Data Value Replication Circuit"; and U.S. patent application Ser. No. 09/839,624 filed Apr. 19, 2001, and entitled "Load Value Queue Input Replication in a Simultaneous and Redundantly Threaded Processor").

BACKGROUND OF THE INVENTION

1. Field of the Invention

The present invention generally relates to microprocessors. More particularly, the present invention relates to a pipelined, multithreaded processor that can execute a program in at least two separate, redundant threads. More particularly still, the invention relates to a method and apparatus for ensuring valid replication of loads from a data cache when cache lines are invalidated and load instructions are performed out of order.

2. Background of the Invention

Solid state electronics, such as microprocessors, are susceptible to transient hardware faults. For example, cosmic rays can alter the voltage levels that represent data values in microprocessors, which typically include tens or hundreds of thousands of transistors. Cosmic radiation can change the state of individual transistors causing faulty operation. Faults caused by cosmic radiation typically are temporary and the transistors eventually switch back to their normal state. The frequency of such transient faults is relatively low—typically less than one fault per year per thousand computers. Because of this relatively low failure rate, making computers fault tolerant currently is attractive more for mission-critical applications, such as online transaction processing and the space program, than computers used by average consumers. However, future microprocessors will be more prone to transient fault due to their smaller anticipated size, reduced voltage levels, higher transistor count, and reduced noise margins. Accordingly, even low-end personal computers may benefit from being able to protect against such faults.

One way to protect solid state electronics from faults resulting from cosmic radiation is to surround the potentially effected electronics by a sufficient amount of concrete. It has been calculated that the energy flux of the cosmic rays can be reduced to acceptable levels with six feet or more of concrete surrounding the computer containing the chips to be protected. For obvious reasons, protecting electronics from faults caused by cosmic ray with six feet of concrete usually is not feasible. Further, computers usually are placed in buildings that have already been constructed without this amount of concrete. Other techniques for protecting microprocessors from faults created by cosmic radiation also have been suggested or implemented.

Rather than attempting to create an impenetrable barrier through which cosmic rays cannot pierce, it is generally more economically feasible and otherwise more desirable to provide the affected electronics with a way to detect and recover from a fault caused by cosmic radiation. In this manner, a cosmic ray may still impact the device and cause a fault, but the device or system in which the device resides can detect and recover from the fault. This disclosure focuses on enabling microprocessors (referred to throughout this disclosure simply as "processors") to recover from a fault condition. One technique, such as that implemented in the Compaq Himalaya system, includes two identical "lockstepped" microprocessors. Lockstepped processors have their clock cycles synchronized and both processors are provided with identical inputs (i.e., the same instructions to execute, the same data, etc.). A checker circuit compares the processors' data output (which may also include memory addressed for store instructions). The output data from the two processors should be identical because the processors are processing the same data using the same instructions, unless of course a fault exists. If an output data mismatch occurs, the checker circuit flags an error and initiates a software or hardware recovery sequence. Thus, if one processor has been affected by a transient fault, its output likely will differ from that of the other synchronized processor. Although lockstepped processors are generally satisfactory for creating a fault tolerant environment, implementing fault tolerance with two processors takes up valuable real estate.

A pipelined, simultaneous multithreaded, out-of-order processor generally can be lockstepped. A "pipelined" processor includes a series of functional units (e.g., fetch unit, decode unit, execution units, etc.), arranged so that several units can be simultaneously processing an appropriate part of several instructions. Thus, while one instruction is being decoded, an earlier fetched instruction can be executed. A "simultaneous multithreaded" ("SMT") processor permits instructions from two or more different program threads (e.g., applications) to be processed through the processor simultaneously. An "out-of-order" processor permits instructions to be processed in an order that is different than the order in which the instructions are provided in the program (referred to as "program order"). Out-of-order processing potentially increases the throughput efficiency of the processor. Accordingly, an SMT processor can process two programs simultaneously.

An SMT processor can be modified so that the same program is simultaneously executed in two separate threads to provide fault tolerance within a single processor. Such a processor is called a simultaneously and redundantly threaded ("SRT") processor. Some of the modifications to turn a SMT processor into an SRT processor are described in Provisional Application Ser. No. 60/198,530.

Executing the same program in two different threads permits the processor to detect faults such as may be caused by cosmic radiation, noted above. By comparing the output data from the two threads at appropriate times and locations within the SRT processor, it is possible to detect whether a fault has occurred. For example, data written to cache memory or registers that should be identical from corresponding instructions in the two threads can be compared. If the output data matches, there is no fault. Alternatively, if there is a mismatch in the output data, a fault has occurred in one or both of the threads.

Although an SRT processor can provide lockstepped execution of redundant threads, forcing the programs to remain lockstepped imposes significant performance penalties. The performance suffers because the two threads are always competing for the same resources, so that no intelligent resource sharing is allowed. The two threads will also suffer the same latency caused by cache misses, and will suffer the same penalty for branch misspeculations. As explained in U.S. patent application Ser. No. 09/584,034 the performance of an SRT processor can be significantly enhanced by eliminating the lockstep requirement and introducing some slack between the execution of the threads. Each of the threads then gains a statistically improved access to processor resources, and is able to benefit in the normal way from out-of-order instruction execution. In addition, the trailing thread is allowed to avoid suffering any cache miss latency if the slack is chosen properly. Further, the branch information from the leading thread is provided to the trailing thread, so that the trailing thread is able to avoid any branch misspeculation. Whenever the slack between the two threads falls below some threshold, the instruction fetch circuitry preferentially fetches more instructions for the leading thread. The net result is faster execution for both threads, and an overall average performance improvement of about 16% has been achieved.

Figure 1:
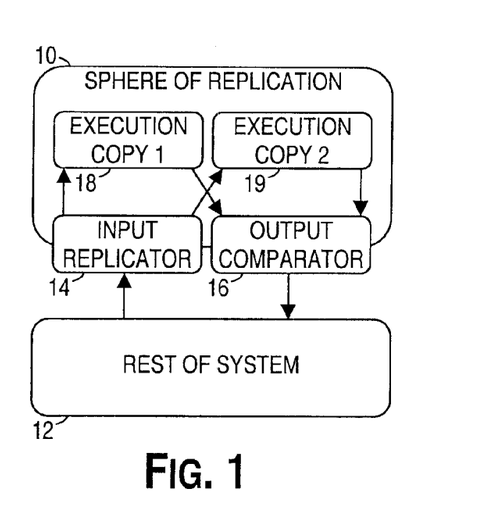
FIG. 1 is a conceptual diagram of a fault-tolerant computing system.

FIG. 1 shows a conceptual model which can be applied to a fault-tolerant system. The system is divided into a sphere of replication 10 and the rest of the system 12. The sphere of replication 10 represents the portion of the system that provides fault protection by duplication. This would include, for example, lockstepped processors (duplicate hardware) or SRT processors (duplication of execution). In FIG. 1, the duplication is shown by redundant execution copies 18, 19. The portion 12 of the system outside the sphere of replication 10 is protected by means other than duplication. This generally includes system memory and disk storage, and often includes cache memories. These portions are commonly protected against faults by parity checks or error correction coding.

The two portions of the system are conceptually coupled by an input replicator 14, and an output comparator 16. The input replicator 14 provides both of the redundant execution copies 18, 19 with identical values, and the output comparator 16 verifies that the output values match before it allows information to be sent to the rest of the system 12. This prevents any faults inside the sphere of replication 10 from propagating to the rest of the system, and it provides an opportunity for fault detection. Upon detecting a fault, the comparator 16 preferably initiates some kind of fault recovery procedure.

In a synchronous, lockstep system, input replicator 14 and output comparator 16 are so straightforward conceptually as to be almost overlooked. At any given clock cycle, the same input is provided to both execution copies 18, 19, and the outputs from both copies 18, 19 are compared for verification. However, the system of U.S. patent application Ser. No. 09/584,034 presents several issues that the replicator and comparator implementations must address. These include a variable slack between inputs and outputs for the execution copies, variable orders of inputs and outputs for the execution copies, and branch misspeculation by only the leading thread. Accordingly, it would be desirable to provide an input replicator implementation that addresses these issues in an efficient manner.

BRIEF SUMMARY OF THE INVENTION

The problems noted above are in large part solved by a processor having an Active Load Address Buffer ("ALAB") that ensures efficient replication of data values retrieved from the data cache. In one embodiment, the processor comprises a data cache, instruction execution circuitry, and an ALAB. The data cache provides temporary storage for data values recently accessed by the instruction execution circuitry. The instruction execution circuitry executes instructions in two or more redundant threads. The threads include at least one load instruction that causes the instruction execution circuitry to retrieve data from the data cache. The ALAB includes entries that are associated with data values that a leading thread has retrieved. The entries include a counter field that is incremented when the instruction execution circuitry retrieves the associated data value for the leading thread, and that is decremented with the associated data value is retrieved for the trailing thread. The entries preferably also include an invalidation field which may be set to prevent further incrementing of the counter field. This field may be used to stall the leading thread until the trailing thread has retrieved the data value the appropriate number of times, thereby returning the counter field to a zero value. Importantly, data blocks in the data cache are "frozen" whenever they have an associated entry in the ALAB with a nonzero counter value. The data blocks are replaced only if no associated entry exists in the ALAB or the associated entry has a zero-valued counter field.

BRIEF DESCRIPTION OF THE DRAWINGS

For a detailed description of the preferred embodiments of the invention, reference will now be made to the accompanying drawings in which:

FIG. 5 is a diagram of an Active Load Address Buffer in accordance with a preferred embodiment While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular system components. As one skilled in the art will appreciate, microprocessor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The term "slack" is intended to mean the number of instructions that one thread is ahead of another thread that is executing the same instruction set.

DETAILED DESCRIPTION OF THE PREFERRED EMBODIMENTS

Figure 2:
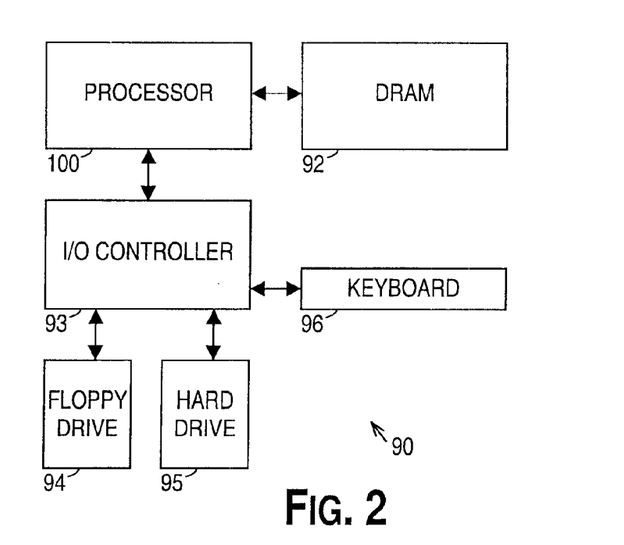
FIG. 2 is a diagram of a fault-tolerant computer including a simultaneous and redundantly threaded processor.

FIG. 2 shows a computer system 90 including a pipelined, simultaneous and redundantly threaded ("SRT") processor 100 constructed in accordance with the preferred embodiment of the invention. Besides processor 100, computer system 90 also includes dynamic random access memory ("DRAM") 92, an input/output ("I/O") controller 93, and various I/O devices which may include a floppy drive 94, a hard drive 95, a keyboard 96, and the like. The I/O controller 93 provides an interface between processor 100 and the various I/O devices 94–96. The DRAM 92 can be any suitable type of memory devices such as RAMBUS™ memory. In addition, SRT processor 100 may also be coupled to other SRT processors if desired in a commonly known "Manhattan" grid, or other suitable architecture.

Figure 4:
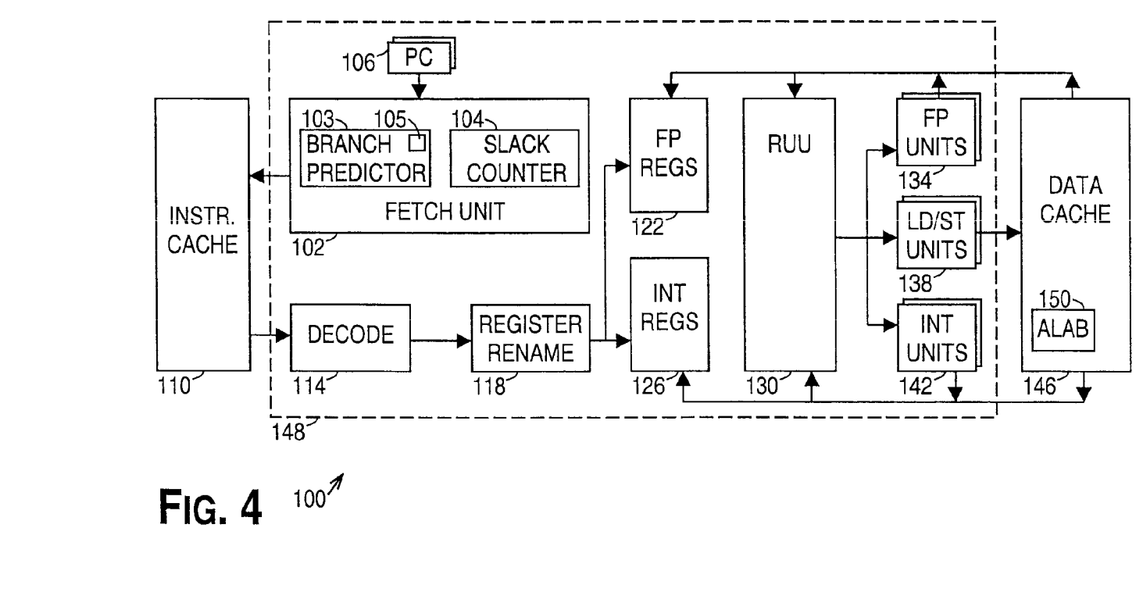
FIG. 4 is a block diagram of the simultaneous and redundantly threaded processor.

FIG. 4 shows the SRT processor 100 of FIG. 1 in greater detail. Referring to FIG. 4, processor 100 preferably comprises a pipelined architecture which includes a series of functional units, arranged so that several units can be simultaneously processing appropriate part of several instructions. As shown, the exemplary embodiment of processor 100 includes a fetch unit 102, one or more program counters 106, an instruction cache 110, decode logic 114, register rename logic 118, floating point and integer registers 122, 126, a register update unit 130, execution units 134, 138, and 142, and a data cache 146.

Fetch unit 102 uses a program counter 106 for assistance as to which instruction to fetch. Being a multithreaded processor, the fetch unit 102 preferably can simultaneously fetch instructions from multiple threads. A separate program counter 106 is associated with each thread. Each program counter 106 is a register that contains the address of the next instruction to be fetched from the corresponding thread by the fetch unit 102. FIG. 4 shows two program counters 106 to permit the simultaneous fetching of instructions from two threads. It should be recognized, however, that additional program counters can be provided to fetch instructions from more than two threads simultaneously.

As shown, fetch unit 102 includes branch prediction logic 103 and a "slack" counter 104. The slack counter 104 will be described in greater detail below. The branch prediction logic 103 permits the fetch unit 102 to speculatively retrieve instructions to be executed after a conditional branch instruction. In order to keep the pipeline full (which is desirable for efficient operation), the branch predictor logic 103 speculates the outcome of a branch instruction before the branch instruction is actually executed. Branch predictor 103 generally bases its speculation on previous executions of the branch instruction. Any suitable speculation algorithm can be used in branch predictor 103.

Referring still to FIG. 4, instruction cache 110 provides a temporary storage buffer for the instructions to be executed. Decode logic 114 retrieves the instructions from instruction cache 110 and determines the type of each instruction (e.g., add, subtract, load, store, etc.). Decoded instructions are then passed to the register rename logic 118 which maps logical registers onto a pool of physical registers.

The register update unit ("RUU") 130 provides an instruction queue for the instructions to be executed. The RUU 130 serves as a combination of global reservation station pool, rename register file, and reorder buffer. The RUU 130 breaks load and store instructions into an address portion and a memory (i.e., register) reference. The address portion is placed in the RUU 130, while the memory reference portion is placed into a load/store queue (not specifically shown in FIG. 4).

The floating point register 122 and integer register 126 are used for the execution of instructions that require the use of such registers as is known by those of ordinary skill in the art. These registers 122, 126 can be loaded with data from the data cache 146. The registers also provide their contents to the RUU 130.

As shown, the execution units 134, 138, and 142 comprise a floating point execution unit 134, a load/store execution unit 138, and an integer execution unit 142. Each execution unit performs the operation specified by the corresponding instruction type. Accordingly, the floating point execution units 134 execute floating instructions such as multiply and divide instructions while the integer execution units 142 execute integer-based instructions. The load/store units 138 perform load operations in which data from memory is loaded into a register 122 or 126. The load/store units 138 also perform load and store operations in which data is transferred between registers 122, 126 and the data cache 146 and/or DRAM memory 92 (FIG. 2).

The data cache 146 operates by storing recently accessed data in a pool of temporary, fast memory blocks. When the pool is filled, the least-recently used block is usually targeted for "replacement", i.e., the data cached in that block is replaced with more recently accessed data. Even when no additional data need to be copied into the cache, cache blocks may be "invalidated", i.e., the data cached in that block is designated as invalid.

In multiprocessor systems, each processor often has its own data cache. This may result in a given portion of memory being cached in multiple caches. Such multiple copies of data may present problems when one processor wishes to alter the data. Before modifying the data, the processor notifies any data caches of other processors having copies of the data that their copies are invalid. This is one circumstance in which a cache may invalidate a cache block.

The architecture and components described herein are typical of microprocessors, and particularly pipelined, multithreaded processors. Numerous modifications can be made from that shown in FIG. 4. For example, the locations of the RUU 130 and registers 122, 126 can be reversed if desired. For additional information, the following references, all of which are incorporated herein by reference, may be consulted for additional information if needed: U.S. patent application Ser. No. 08/775,553, filed Dec. 31, 1996. and "Exploiting Choice: Instruction Fetch and Issue on an Implementable Simultaneous Multithreaded Processor," by D. Tullsen, S. Eggers, J. Emer, H. Levy, J. Lo and R. Stamm, Proceedings of the 23$^{rd}$ Annual International Symposium on Computer Architecture, Philadelphia, Pa., May 1996.

The preferred embodiment of the invention provides a performance enhancement to SRT processors while ensuring algorithmic correctness. The preferred SRT processor 100 described above is capable of processing instructions from two different threads simultaneously. Such a processor in fact can be made to execute the same program as two different threads. In other words, the two threads contain the same exact set of program instructions. Processing the same program through the processor in two different threads permits the processor to detect faults caused by cosmic radiation as noted above.

Figure 3:
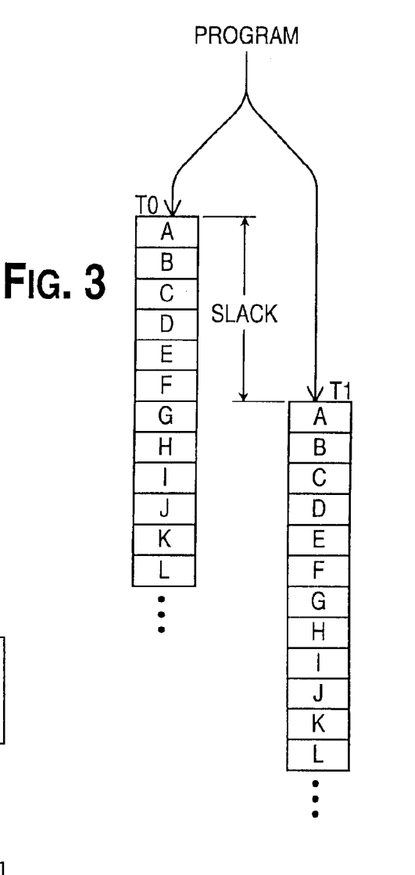
FIG. 3 is an illustrative diagram showing how execution of one thread is delayed relative to the other thread.

Referring still to FIG. 4, fetch unit 102 preferably includes a "slack" counter 104. Slack counter 104 is used to create a delay of a desired number of instructions between the two threads including the same instruction set. The delay is referred to herein as a "slack." The description of and advantage of the slack will now be explained with reference to FIG. 3 followed by a discussion of how the slack counter 104 is used to create the slack. FIG. 3 shows a single program that is copied by fetch unit 102 (FIG. 4) into two threads—thread T0 and thread T1. Both threads include instructions A–L as shown, and perhaps more. Thread T0 is arbitrarily designated as the "leading" thread while thread T1 is designated as the "trailing" thread. As shown in the conceptual drawing of FIG. 3, the instructions in trailing thread T1 begin their way through the pipeline of processor 100 six instructions behind or after leading thread T0. Thus, while processor 100 begins fetching and processing instructions A, B, C, etc. from leading thread T0, the fetch unit 102 of processor 100 will not begin fetching instruction A from the trailing thread T1 until the fetch unit 102 has already fetched the first six instructions from the leading thread. Until the slack threshold is reached, the processor's resources are fully available to execute the instructions from leading thread T0. After the slack threshold is reached, the resources are apportioned between instructions from both threads. As explained below, the slack advantageously provides a substantial performance improvement to the multi-threaded processor art.

Referring to FIGS. 3 and 4, once a branch instruction has executed in an execution unit 134, 138, 142, a register 105 in the branch predictor logic 103 is updated with the correct result of the branch. Thus, register 105 will indicate the correct direction of program execution following the branch instruction. Because of the slack between the two threads, some or all branch instructions in the leading thread preferably will be resolved before the corresponding branch instructions from the trailing thread Ti are fetched. When fetching a branch instruction from the trailing thread, the fetch unit preferably probes the register 105 in the branch predictor logic 103 to determine if that particular branch instruction from the leading thread has already been fetched and resolved. If so, branch speculation is carried out with 100% accuracy (in the absence of a fault) in the trailing thread, because the leading thread has already determined the next instruction to execute after the branch instruction. As such, speculation of trailing thread branch instructions is conducted, but misspeculation is generally nonexistent. Accordingly, the latency caused by branch misspeculation is avoided in the trailing thread.

Similarly, cache misses can be avoided in the trailing thread. Some or all cache misses in the leading thread will result in the requested data being written to the processor's data cache 146. When that same instruction is processed in the trailing thread, the requested data will already be present in data cache 146 thereby a cache miss in the trailing thread and eliminating the latency such a cache miss would have caused.

In short, the introduction of slack permits the leading thread to resolve all or most branch misspeculations and cache misses so that the corresponding instructions in the trailing thread will not experience the same latency problems. Thus, the introduction of slack into the simultaneous multithreaded operation achieves at least two performance benefits—reducing the frequency of cache misses and branch misspeculations in the trailing thread.

The use of the slack counter 104 to create the instruction slack between the leading and trailing threads will now be described. The slack counter 104 preferably is a signed counter that is decremented when the leading thread T0 commits an instruction ("committing" an instruction refers to the process of completing the execution of and retiring an instruction). Further, the counter is incremented when the trailing thread commits an instruction. The counter 104 preferably is initialized at system reset to the target slack. As the leading thread incurs various latencies that the trailing thread does not encounter, the initial slack between the threads will decrease. The fetch unit 102 monitors the slack, and when the slack falls below a selected threshold, the fetch unit 102 preferentially retrieves instructions for the leading thread until the slack is re-established. This process automatically guides the fetch unit 102 to maintain the desired instruction slack.

The amount of slack in the example of FIG. 3 is six instructions. In general, the amount of slack can be any desired number of instructions. For example, as shown in Provisional patent application Ser. No. 60/198530 filed on Apr. 19, 2000, a slack of 256 instructions was shown to provide a 10% performance increase. The amount of slack can be preset or programmable by the user of computer system 90 and preferably is large enough to permit the leading thread to resolve some, most, or all cache misses and branch misspeculations before the corresponding instructions from the trailing thread are executed. It will also be understood by one of ordinary skill in the art that, in certain situations, the two threads will have to synchronized thereby reducing the slack to zero. Examples of such situations include uncached loads and external interrupts.

In FIG. 4, the "sphere of replication" 148 is shown in broken outline. It preferably includes at least the instruction execution circuitry, namely, the instruction decode logic 114 and the execution units 134, 138, and 142. The registers 122, 126, and associated register management hardware 118, 130, are preferably also included. This is not the only sphere of replication which could be chosen, but it represents a convenient and preferred choice. The inputs to sphere 148 may include Instructions, Load Data, and External Interrupts. The outputs from sphere 148 may include Instruction Addresses, Load Addresses, and Store Addresses & Data. Replication of External Interrupts, and comparison of Store Addresses & Data, are dealt with in related applications.

The instruction cache 110 receives Instruction Addresses from the sphere 148, and responds with Instructions. The addresses may be for instructions in instruction cache 110, or they may be for instructions not yet cached, but in either case, the effects are the same. In a preferred embodiment, comparison of the Instruction Addresses generated by from the two threads is not done. Such a comparison is believed unnecessary, because an incorrect instruction address can never alter the architectural state of the system outside the sphere 148. The fault that causes the incorrect instruction address to be generated will be detected subsequently when an incorrect instruction is executed. Similarly, no special steps are taken to ensure replication of the Instructions. Because the Instructions are never altered during program execution, the instruction cache 110 will always provide the correct instruction value in response to receiving the Instruction Address. The instruction cache may include parity check bits to ensure that the Instruction is not altered between fetches by the two threads.

The data cache 146 receives Load Addresses from sphere 148, and responds with Load Data. The Load Addresses may be for data in the data cache 146, or they may be for uncached data. In the preferred embodiment, comparison of cached Load Addresses is not done, for the same reasons that Instruction Address comparison is not done. Such comparison is believed unnecessary, because an incorrect address for loading cached data cannot affect the architectural state of the system outside the sphere 148. The fault that causes incorrect data to be loaded can be detected subsequently by comparing the results of operations on the incorrect data. However, unlike instructions, the cached data is often subject to change. Accordingly, special precautions are taken to ensure replication of the input data, as described further below.

Load Addresses for uncached data may affect the state of various I/O devices, and accordingly, it is necessary to perform a comparison of uncached Load Addresses before issuing the Load Address outside sphere 148. In the preferred embodiment, this is done by stalling the leading thread until the trailing thread catches up and issues the corresponding Load Address, and comparing the two Load Addresses before issuing it outside the sphere 148. Because the threads are now synchronized, the uncached Load Data is easily replicated upon entry into sphere 148.

Input replication of cached Load Data is problematic because data values can be modified from outside the processor. For example, consider a program waiting in a spin loop on a cached synchronization flag to be updated by another processor. The program may count the number of loop iterations in order to profile waiting times or adaptively switch synchronization algorithms. To prevent redundant threads from diverging, both threads must spin for an identical number of iterations. That is, the update of the flag must appear to occur in the same loop iteration in each thread, even if these corresponding iterations are widely separated in time. Simply invalidating or updating the cache will likely cause the leading thread to execute more loop iterations than the trailing thread.

In the preferred embodiment, the data cache 146 includes an Active Load Address Buffer ("ALAB") 150 that ensures replication of cached Load Data. The ALAB provides correct input replication of cached load data by guaranteeing that corresponding loads from redundant threads will return the same value from the data cache. To provide this guarantee, the ALAB delays a cache block's replacement or invalidation after the execution of a load in the leading thread until the retirement of the corresponding load in the trailing thread.

Figure 5:
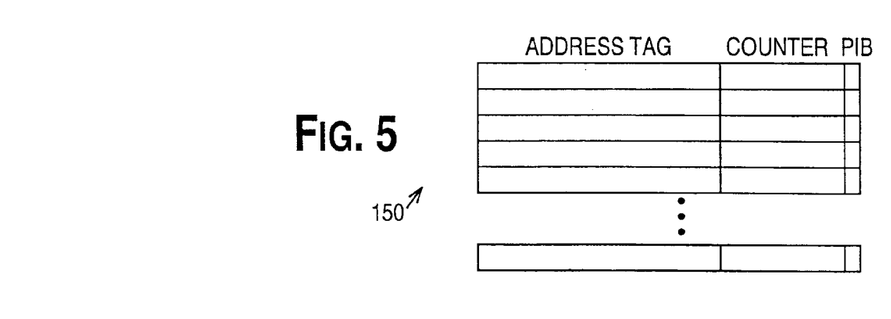

FIG. 5 shows a preferred configuration of the ALAB 150. The preferred configuration comprises a collection of identical entries, each containing an address tag, a counter, and a pending-invalidate bit. When a leading thread's load executes, the ALAB is searched for an entry whose address tag matches the load's effective address (the effective address is the location of the data in the cache); if none is found, a new entry is allocated. Finally, the entry's counter is incremented to indicate an outstanding load to the block. When a trailing thread's load retires, the ALAB is again searched and the matching entry's counter is decremented. In a contemplated embodiment, the trailing thread may be allowed to allocate new entries in the ALAB and decrement the counter value to less than zero. This circumstance may occur if the designated trailing thread actually gets ahead of the designated leading thread. However, in the preferred embodiment (which employs a branch outcome queue), the designated leading thread is never allowed to fall behind the designated trailing thread.

In the absence of address corruption, the trailing thread is guaranteed to find a matching entry because non-zero ALAB entries cannot be replaced. A corrupted address can be detected as the absence of a match at this point, or as a deadlock condition later (if a spurious match occurs and the wrong entry is incremented or decremented). In any case, the fault can be caught by an output comparison mechanism before it propagates outside the sphere 148.

When a cache block is about to be replaced or invalidated, the ALAB 150 is searched for an entry matching the block's address. If a matching entry with a non-zero count is found, the block cannot be replaced or invalidated until all of the trailing thread's outstanding accesses to the block have completed. At this point, the counter will be zero and the block can be released. (An invalidation request may be acknowledged immediately; however, depending on the memory consistency model, the processor may have to stall other memory requests until the ALAB counter reaches zero.) To guarantee that the counter eventually reaches zero, the cache sets the ALAB entry's pending-invalidate bit to indicate that it is waiting; leading thread loads that attempt to increment an entry having its pending-invalidate bit set are stalled. Because the trailing thread can always make forward progress, the outstanding loads will eventually complete.

Because the ALAB must reliably track every outstanding load, non-zero ALAB entries cannot be evicted. A leading-thread load must stall if it cannot allocate a new entry due to ALAB mapping conflicts, or if it would increment the entry's counter beyond the maximum value. Because loads are executed out of order, it is possible that a leading-thread load will be forced to stall because loads that follow it in program order have saturated the counter or acquired all the conflicting entries in an ALAB set. The processor can detect this deadlock condition by recognizing when (1) the trailing thread has caught up to the leading thread and (2) the leading thread's oldest instruction is a load stalled because it cannot perform its ALAB increment. In this case, the processor must flush the leading thread from the pipeline (as on a misspeculation), decrementing the ALAB counters corresponding to executed but squashed loads. The stalled load can then re-issue; because the trailing thread has committed all outstanding loads, the re-issued load is guaranteed not to stall on the ALAB increment. In experiments using a 64-entry fully associative ALAB with 7-bit counters, this deadlock never occurred over the course of 2.2 billion instructions in eleven different benchmarks. However, a 32-entry ALAB in the same experiments triggered this deadlock 35 times.

It is noted that the ALAB may be implemented as a direct-mapped, set-associative, or fully associative memory. The preferred embodiment is a fully associative memory. In an alternate embodiment, each of the blocks in the data cache may be directly associated with a counter and a pending-invalidate bit. This would eliminate the searching of the ALAB at the expense of increased hardware in the data cache.

Accordingly, the preferred embodiment of the invention provides a significant performance increase of an SRT processor that can execute the same instruction set in two different threads and ensure cache Data Load replication. The above discussion is meant to be illustrative of the principles and various embodiments of the present invention. Numerous variations and modifications will become apparent to those skilled in the art once the above disclosure is fully appreciated. For example, if more than 2 redundant threads are executed by the processor (say a total of M threads), the leading thread may increment the ALAB counters by (M−1) when performing a load, and each of the remaining threads may decrement the ALAB counters by one when performing the corresponding load. It is intended that the following claims be interpreted to embrace all such variations and modifications.

What is claimed is:

1. A processor, comprising:
    a data cache;
    instruction execution circuitry configured to execute instructions in two or more redundant threads, wherein the threads include load instructions that cause the instruction execution circuitry to retrieve data from the data cache; and
    a counter associated with a data block in the data cache, wherein the counter is incremented when the instruction execution circuitry executes a load instruction to retrieve data from the data block for one of the two or more redundant threads (hereafter designated as the leading thread), and wherein the counter is decremented when the instruction execution circuitry executes a load instruction to retrieve data from the data block for a different one of the two or more redundant threads (hereafter designated as a trailing thread).

2. The processor of claim 1, further comprising:
    a pending invalidate bit associated with said data block, wherein the pending invalidate bit is reset when the data cache stores data in the data block, and wherein the pending invalidate bit is set when the data in the data block is invalidated and the counter holds a nonzero value.

3. The processor of claim 1, further comprising:
    a pending invalidate bit associated with said data block, wherein the pending invalidate bit is reset when the data cache stores data in the data block, and wherein the pending invalidate bit is set when the data in the data block is selected for replacement and the counter holds a nonzero value.

4. The processor of claim 1, wherein the counter is always incremented by an amount equal to the number of redundant threads minus one.

5. The processor of claim 1, wherein the counter is one of a plurality of counters, wherein each of the plurality of counters is associated with a respective data block in the data cache, wherein each of the counters is incremented when the instruction execution circuitry executes a load for the leading thread to retrieve data from the respective data block, and wherein each of the plurality of counters is decremented when the instruction execution circuitry executes a load instruction for the trailing thread to retrieve data from the respective data block.

6. The processor of claim 5, further comprising:
    a plurality of pending invalidate bits each associated with a corresponding one of said plurality of counters, wherein each pending invalidate bit is reset when the data cache stores data in the respective data block of the corresponding counter, and wherein each pending invalidate bit is set when the data in the respective data block of the corresponding counter is invalidated and the corresponding counter holds a nonzero value.

7. The processor of claim 5, further comprising:
    a plurality of pending invalidate bits each associated with a corresponding one of said plurality of counters, wherein each pending invalidate bit is reset when the data cache stores data in the respective data block of the corresponding counter, and wherein each pending invalidate bit is set when the respective data block of the corresponding counter is selected for replacement and the corresponding counter holds a nonzero value.

8. The processor of claim 7, further comprising:
    a plurality of address tag registers each associated with a corresponding one of said plurality of counters to indicate the respective data block associated with the counter.

9. The processor of claim 8, wherein when the instruction execution circuitry executes a load instruction for the leading thread to retrieve data from the data cache, the plurality of address tag registers is searched for an address tag that matches the data block containing the data, and if no match is found, an available one of the address tag registers is set to indicate the data block containing the data, and the associated counter is incremented.

10. The processor of claim 9, wherein an address tag register is available if the associated counter has a zero value.

11. A method of replicating cached data in a redundantly threaded processor, wherein the method comprises:
    executing a load instruction associated with a leading thread to retrieve a data value from a data cache;
    determining if a pending invalidate bit associated with an address of said data value is set;
    if the pending invalidate bit is not set: incrementing a counter associated with said address of said data value;
    executing a load instruction associated with a trailing thread to retrieve said data value from the data cache; and
    decrementing said counter.

12. The method of claim 11, further comprising, after said act of determining:
    if the pending invalidate bit is set: stalling the leading thread until the counter reaches zero.

13. The method of claim 11, further comprising, before said act of determining:
    searching a buffer for an entry that matches the address of said data value, wherein the buffer entries include an address field, a counter field, and a pending invalidate bit field; and
    if a match is not found, allocating an available entry in the buffer by setting the address tag to associate the entry with the address of said data value.

14. The method of claim 13, wherein an entry in the buffer is available when the counter field is zero.

15. The method of claim 13, further comprising, before said act of allocating:
    attempting to locate an available entry; and
    if no entry is available:
        stalling the leading thread until the trailing thread has retired all load instructions corresponding to load instructions previously performed by the leading thread.

16. The method of claim 11, wherein the redundantly threaded processor executes more than two threads, wherein said act of incrementing the counter increments the counter by an amount equal to the number of threads minus one, and wherein said act of decrementing the counter decrements the counter by one.

17. The method of claim 11, further comprising:
identifying a data block of the data cache for replacement;
searching a buffer for an entry that matches the data block, wherein the buffer entries include an address field, a counter field, and a pending invalidate bit field;
determining if the counter field in the entry contains a zero value;
setting the pending invalidate bit field if the counter field is nonzero; and
replacing the data block when the counter field is zero.

18. A computer system, comprising:
a simultaneously and redundantly threaded ("SRT") processor;
an I/O controller coupled to said processor;
an I/O device coupled to said I/O controller; and
an main system memory coupled to said processor;
wherein said SRT processor processes a set of program instructions as a leading thread and also as a trailing thread, wherein at least on of the program instructions is a load instruction that causes the processor to retrieve a data value from a data cache, and wherein the processor includes:
an active load address buffer having entries that include an address field and a counter field, wherein when the processor processes the load instruction in the leading thread, the address field is set to indicate an address of the data value and the counter field is incremented, and wherein when the processor processes the load instruction in the trailing thread, the address field is searched to locate the entry whose address field is set to indicate the address of the data value, and the counter field is decremented.

19. The computer system of claim 18, wherein the entries of the active load address buffer further include an invalidation field, wherein when the invalidation field is set, the processor is unable to increment the counter field.

20. The computer system of claim 19, wherein the data value from the data cache can only be replaced or invalidated if the active load address buffer does not include an entry associated with the data value and having a nonzero counter field.

* * * * *